(12) United States Patent
Naganuma et al.

(10) Patent No.: US 11,029,820 B2
(45) Date of Patent: Jun. 8, 2021

(54) INFORMATION PROCESSING APPARATUS, NON-TRANSITORY COMPUTER READABLE RECORDING MEDIUM THAT RECORDS A DASHBOARD APPLICATION PROGRAM, AND IMAGE FORMING APPARATUS MANAGEMENT SYSTEM

(71) Applicant: KYOCERA DOCUMENT SOLUTIONS INC., Osaka (JP)

(72) Inventors: Yuzuru Naganuma, Concord, CA (US); Masayoshi Nakamura, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/452,782

(22) Filed: Jun. 26, 2019

(65) Prior Publication Data
US 2020/0409514 A1    Dec. 31, 2020

(51) Int. Cl.
*G06F 3/0482*    (2013.01)
(52) U.S. Cl.
CPC ................ *G06F 3/0482* (2013.01)
(58) Field of Classification Search
CPC .................................................. G06F 3/0482
USPC ......................................................... 715/765
See application file for complete search history.

(56) References Cited

U.S. PATENT DOCUMENTS

| | | | | |
|---|---|---|---|---|
| 6,661,434 B1* | 12/2003 | MacPhail | ............. | G06F 3/0481 715/772 |
| 7,380,213 B2* | 5/2008 | Pokorny | ............... | B23Q 35/12 715/764 |
| 7,555,719 B1* | 6/2009 | Yehuda | ................... | H04L 41/22 715/734 |
| 7,673,247 B1* | 3/2010 | Nicholson | .............. | G06Q 10/06 715/764 |
| 9,485,265 B1* | 11/2016 | Saperstein | ........ | G06F 16/24544 |
| 9,792,017 B1* | 10/2017 | Landefeld | ........... | G06F 3/04883 |
| 2006/0149407 A1* | 7/2006 | Markham | ........ | G05B 19/41875 700/108 |
| 2009/0013281 A1* | 1/2009 | Helfman | ............... | G06F 3/0484 715/788 |
| 2010/0318934 A1* | 12/2010 | Blevins | ................ | G05B 13/048 715/772 |

(Continued)

FOREIGN PATENT DOCUMENTS

JP    2002-297715 A    10/2002

*Primary Examiner* — Daniel Rodriguez
(74) *Attorney, Agent, or Firm* — Li & Cai Intellectual Property (USA) Office (57) ABSTRACT

An information processing apparatus includes an outlier detecting unit configured to detect an outlier value included in the numerical value about the certain element, an analysis candidate determining unit configured to determine an analysis candidate if the outlier value about the certain element is detected, the analysis candidate indicating a candidate of an analysis action for the outlier value about the certain element, and an analysis candidate display unit configured to generate a first GUI indicating the outlier value, and display the first GUI in association with the outlier value in the chart displayed on the display device, and generate a second GUI configured to instruct to execute the analysis action that the analysis candidate indicates, and display the second GUI on the display device if the first GUI displayed on the display device is operated or pointed by a cursor.

15 Claims, 8 Drawing Sheets

(56) References Cited

U.S. PATENT DOCUMENTS

| | | | |
|---|---|---|---|
| 2011/0040660 A1* | 2/2011 | Allison | G06Q 10/087 |
| | | | 705/28 |
| 2013/0132867 A1* | 5/2013 | Morris | G06F 3/048 |
| | | | 715/759 |
| 2014/0160131 A1* | 6/2014 | Azizi | G06T 11/206 |
| | | | 345/440 |
| 2014/0185790 A1* | 7/2014 | Leta | G06Q 10/06398 |
| | | | 379/265.08 |
| 2014/0223325 A1* | 8/2014 | Melendez | G06F 3/1273 |
| | | | 715/744 |
| 2014/0379437 A1* | 12/2014 | Singh | G06Q 10/06393 |
| | | | 705/7.39 |
| 2015/0134694 A1* | 5/2015 | Burke | G06Q 10/06398 |
| | | | 707/769 |
| 2016/0285707 A1* | 9/2016 | Pawlowski | G06F 3/04842 |
| 2017/0118094 A1* | 4/2017 | Rao | G06Q 10/0631 |
| 2017/0255978 A1* | 9/2017 | Hagiwara | G06Q 10/0875 |
| 2017/0351787 A1* | 12/2017 | Kapuschat | G08B 31/00 |
| 2018/0143891 A1* | 5/2018 | Polisetty | G06F 11/3006 |
| 2018/0321663 A1* | 11/2018 | Kipersztok | G06Q 10/06312 |
| 2018/0357556 A1* | 12/2018 | Rai | G06N 20/00 |
| 2019/0007512 A1* | 1/2019 | Li | H04L 63/1408 |
| 2019/0088351 A1* | 3/2019 | Takarada | G16H 10/65 |
| 2019/0228296 A1* | 7/2019 | Gefen | G06F 11/079 |
| 2019/0228353 A1* | 7/2019 | Gefen | G06Q 10/067 |
| 2019/0347181 A1* | 11/2019 | Cranfill | G06F 21/6218 |
| 2020/0126309 A1* | 4/2020 | Moroze | G06T 19/20 |

* cited by examiner

| Element | Outlier value condition | Analysis candidates |
|---|---|---|
| Wasted sheet volume<br><br>111 | Wasted sheet volume ><br>first threshold<br><br>121 | (1) Action of generating and displaying chart widget (e.g., bar chart widget) showing numerical values of wasted sheet volume in subdivided time periods (e.g., month, week, or day) in certain time period.<br>(2) Action of generating and displaying chart widget (e.g., pie chart widget) showing breakdown (e.g., ratio of cancel, jam, and job execution error) of causes of wasted sheet volume in certain time period.<br>(3) Action of generating and displaying chart widget (e.g., pie chart widget) showing breakdown of numerical values sorted by medium type of wasted sheet volume in certain time period.<br>(4) Action of generating and displaying list of jobs executed by image forming apparatus and list widget of information processing apparatus.<br><br>131 |
| Wasted ink volume<br><br>112 | Wasted ink volume ><br>second threshold<br><br>122 | (1) Action of generating and displaying chart widget (e.g., bar chart widget) showing numerical value of wasted ink volume in subdivided time periods (e.g., month, week, or day) in certain time period.<br>(2) Action of generating and displaying chart widget (e.g., pie chart widget) showing breakdown (e.g., ratio of cancel, jam, and job execution error) of causes of wasted ink volume within certain time period.<br>(3) Action of generating and displaying list of jobs executed by image forming apparatus and list widget of information processing apparatus.<br><br>132 |
| Pause time length<br><br>113 | Pause time length ><br>third threshold<br><br>123 | (1) Action of generating and displaying chart widget (e.g., bar chart widget) showing numerical value of pause time length in subdivided time periods (e.g., month, week, or day) in certain time period.<br>(2) Action of generating and displaying chart widget (e.g., pie chart widget) showing breakdown (e.g., ratio of cancel, jam, and job execution error) of causes of pause time length in certain time period.<br>(3) Action of generating and displaying list of jobs executed by image forming apparatus and list widget of information processing apparatus.<br><br>133 |

INFORMATION PROCESSING APPARATUS, NON-TRANSITORY COMPUTER READABLE RECORDING MEDIUM THAT RECORDS A DASHBOARD APPLICATION PROGRAM, AND IMAGE FORMING APPARATUS MANAGEMENT SYSTEM

BACKGROUND OF THE INVENTION

1. Field of the Invention

The present disclosure relates to a non-transitory computer readable recording medium that records a dashboard application program for displaying information collected from an image forming apparatus. The present disclosure further relates to an information processing apparatus configured to execute the dashboard application program. The present disclosure further relates to an image forming apparatus management system including the image forming apparatus and the information processing apparatus.

2. Description of Related Art

There is known a dashboard application for displaying a chart widget showing a time-varying trend of numerical values of a certain element in a certain time period on the basis of information collected from an image forming apparatus.

SUMMARY OF THE INVENTION

According to an embodiment of the present disclosure, there is provided an information processing apparatus, including:
a controller circuit configured to operate as
a widget generating unit configured to generate a widget about a certain element of an image forming apparatus in a certain time period,
a numerical value obtaining unit configured to obtain a numerical value about the certain element of the image forming apparatus in the certain time period,
a chart display unit configured to generate a chart on a basis of the widget and the numerical value, and display the chart on a display device,
an outlier detecting unit configured to detect an outlier value included in the numerical value about the certain element,
an analysis candidate determining unit configured to determine an analysis candidate if the outlier value about the certain element is detected, the analysis candidate indicating a candidate of an analysis action for the outlier value about the certain element, and
an analysis candidate display unit configured to
generate a first GUI indicating the outlier value, and display the first GUI in association with the outlier value in the chart displayed on the display device, and
generate a second GUI configured to instruct to execute the analysis action that the analysis candidate indicates, and display the second GUI on the display device if the first GUI displayed on the display device is operated or pointed by a cursor.

According to an embodiment of the present disclosure, there is provided a non-transitory computer readable recording medium that records a dashboard application program, the dashboard application program causing a controller circuit of an information processing apparatus to operate as:
a widget generating unit configured to generate a widget about a certain element of an image forming apparatus in a certain time period;
a numerical value obtaining unit configured to obtain a numerical value about the certain element of the image forming apparatus in the certain time period;
a chart display unit configured to generate a chart on a basis of the widget and the numerical value, and display the chart on a display device;
an outlier detecting unit configured to detect an outlier value included in the numerical value about the certain element;
an analysis candidate determining unit configured to determine an analysis candidate if the outlier value about the certain element is detected, the analysis candidate indicating a candidate of an analysis action for the outlier value about the certain element; and
an analysis candidate display unit configured to
generate a first GUI indicating the outlier value, and display the first GUI in association with the outlier value in the chart displayed on the display device, and
generate a second GUI configured to instruct to execute the analysis action that the analysis candidate indicates, and display the second GUI on the display device if the first GUI displayed on the display device is operated or pointed by a cursor.

According to an embodiment of the present disclosure, there is provided an image forming apparatus management system, including:
an image forming apparatus; and
an information processing apparatus including
a controller circuit configured to operate as
a widget generating unit configured to generate a widget about a certain element of an image forming apparatus in a certain time period,
a numerical value obtaining unit configured to obtain a numerical value about the certain element of the image forming apparatus in the certain time period,
a chart display unit configured to generate a chart on a basis of the widget and the numerical value, and display the chart on a display device,
an outlier detecting unit configured to detect an outlier value included in the numerical value about the certain element,
an analysis candidate determining unit configured to determine an analysis candidate if the outlier value about the certain element is detected, the analysis candidate indicating a candidate of an analysis action for the outlier value about the certain element, and
an analysis candidate display unit configured to
generate a first GUI indicating the outlier value, and display the first GUI in association with the outlier value in the chart displayed on the display device, and
generate a second GUI configured to instruct to execute the analysis action that the analysis candidate indicates, and display the second GUI on the display device if the first GUI displayed on the display device is operated or pointed by a cursor.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 5 shows an example of a structure of an analysis candidate table;

DETAILED DESCRIPTION OF THE PREFERRED EMBODIMENTS

Hereinafter, an embodiment of the present disclosure will be described with reference to the drawings.

1. Image Forming Apparatus Management System

Figure 1:
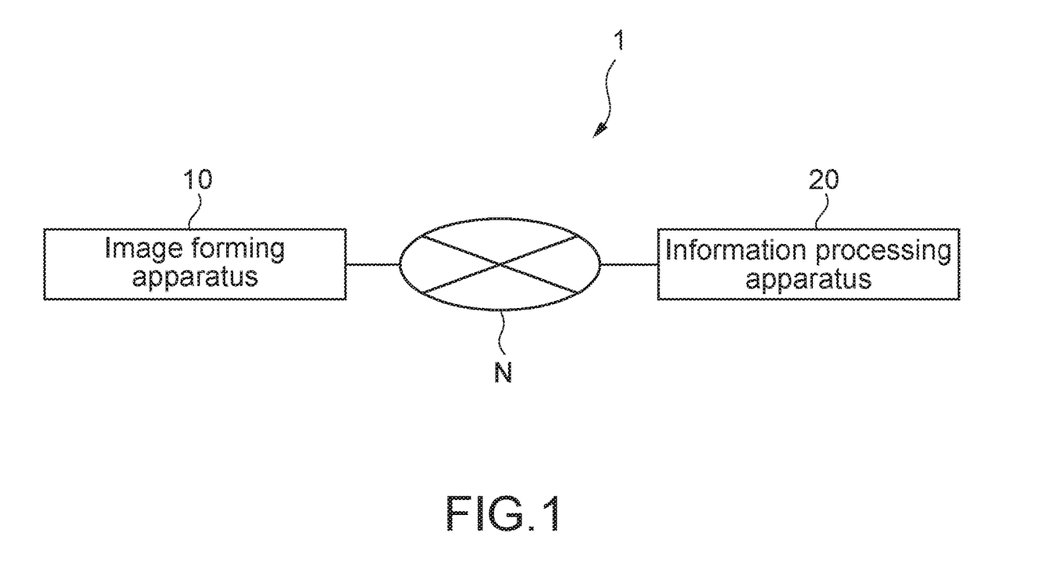
FIG. 1 shows an image forming apparatus management system according to an embodiment of the present disclosure.

FIG. 1 shows an image forming apparatus management system according to an embodiment of the present disclosure.

The image forming apparatus management system 1 includes the image forming apparatus 10 and the information processing apparatus 20. The image forming apparatus 10 and the information processing apparatus 20 are connected to each other and are capable of communicating with each other. For example, the image forming apparatus 10 and the information processing apparatus 20 are connected to each other via the network N such as a LAN or the Internet (FIG. 1). Alternatively, the image forming apparatus 10 and the information processing apparatus 20 may be connected to each other not via a network (not shown).

The image forming apparatus 10 is, typically, a production printer or an MFP (Multifunction Peripheral).

The information processing apparatus 20 is, typically, a personal computer or a tablet device. A user who uses the information processing apparatus 20 is, typically, an administrator (for example, an operator, a manager, or the like of a print shop in which the image forming apparatus 10 is provided) of the image forming apparatus 10.

2. Hardware Configuration of Image Forming Apparatus

Figure 2:
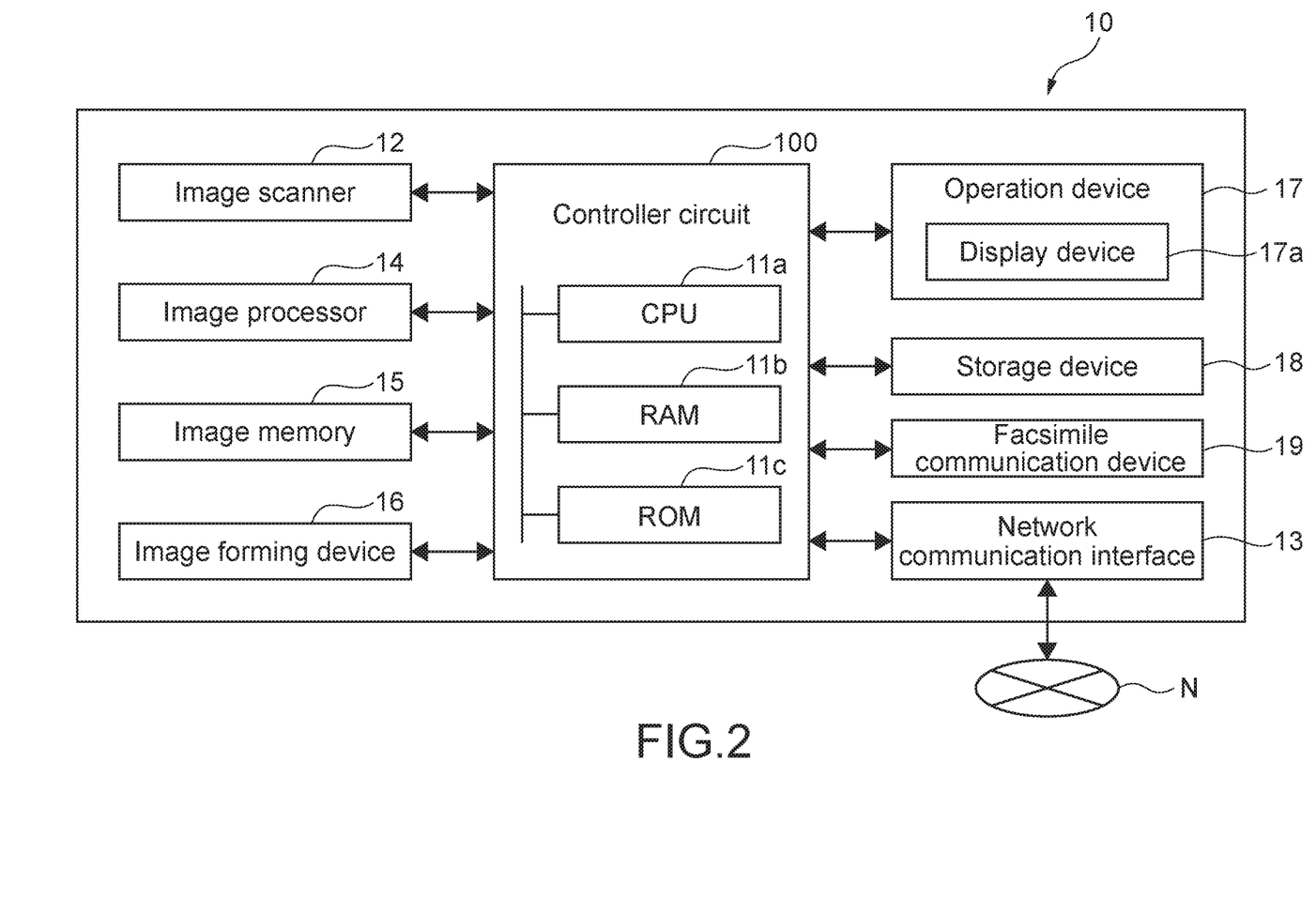
FIG. 2 shows a hardware configuration of an image forming apparatus according to an embodiment of the present disclosure.

FIG. 2 shows a hardware configuration of an image forming apparatus according to an embodiment of the present disclosure.

The image forming apparatus 10 includes the controller circuit 100. The controller circuit 100 includes the CPU (Central Processing Unit) 11a (processor), the RAM (Random Access Memory) 11b, the ROM (Read Only Memory) 11c (memory), dedicated hardware circuits, and the like and performs overall operational control of the image forming apparatus 10. The CPU 11a loads information processing programs (including image processing program) stored in the ROM 11c in the RAM 11b and executes the information processing programs. The nonvolatile ROM 11c stores information processing programs executed by the CPU 11a and data. The ROM 11c is an example of a non-transitory computer readable recording medium.

The controller circuit 100 is connected to the image scanner 12, the image processor 14 (including GPU (Graphics Processing Unit)), the image memory 15, the image forming device 16 (printer), the operation device 17 including the display device 17a (touch panel), the large-volume nonvolatile storage device 18 such as an HDD (Hard Disk Drive) or an SSD (Solid State Drive), the facsimile communication device 19, the network communication interface 13, and the like. The controller circuit 100 performs operational control of the respective devices connected thereto and sends/receives signals and data to/from those devices. The operation device 17 including the display device 17a (touch panel) is an embodiment of an input device. A sound input device including a microphone may be provided as an input device.

3. Hardware Configuration of Information Processing Apparatus

Figure 3:
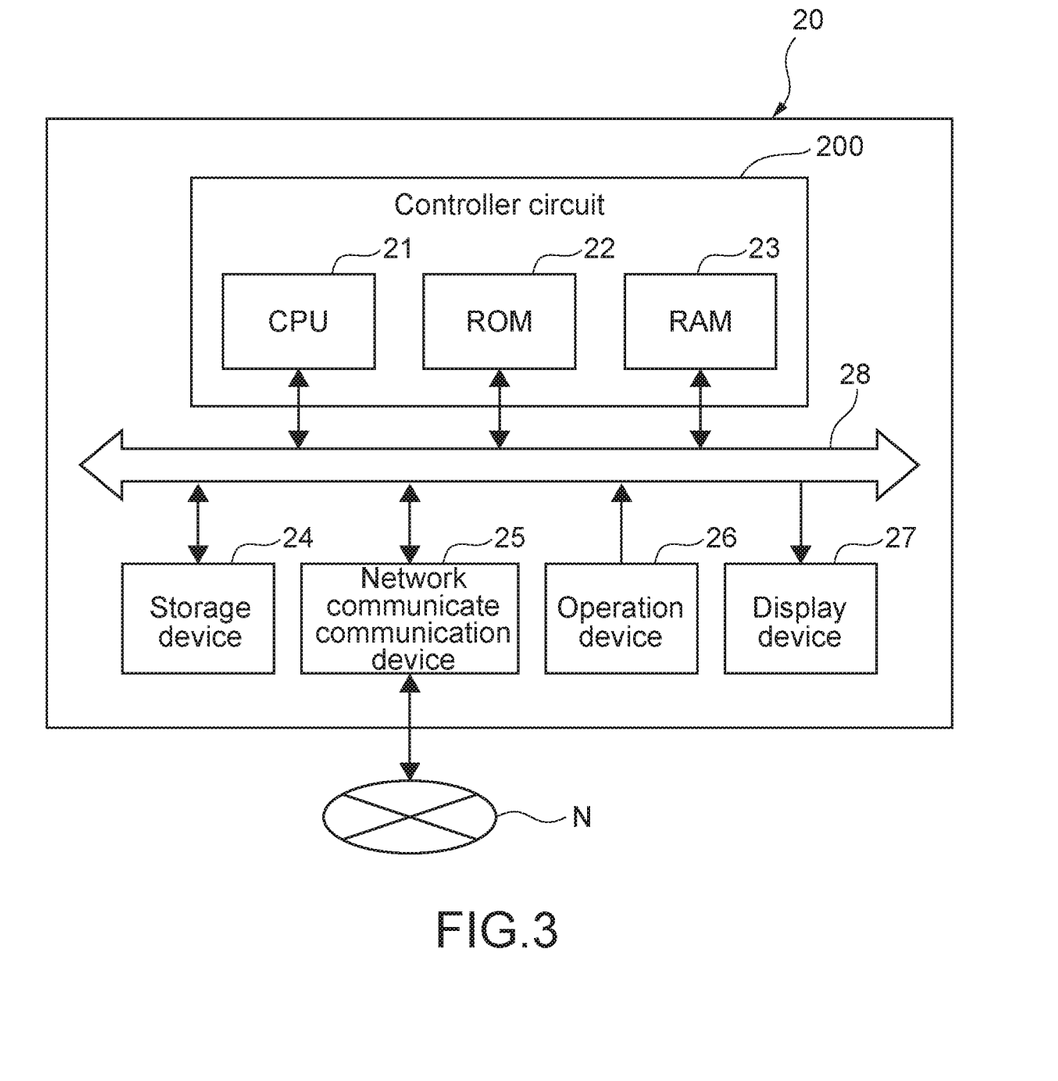
FIG. 3 shows a hardware configuration of an information processing apparatus.

FIG. 3 shows a hardware configuration of an information processing apparatus.

The information processing apparatus 20 includes the CPU 21, the ROM 22, the RAM 23, the storage device 24, the network communication device 25, the operation device 26, and the display device 27, and the bus 28 connecting them to each other.

The controller circuit 200 includes the CPU 21, the ROM 22, and the RAM 23. The CPU 21 loads information processing programs (including dashboard application program) stored in the ROM 22 in the RAM 23 and executes the information processing programs. The nonvolatile ROM 22 stores information processing programs executed by the CPU 21 and data. The ROM 22 is an example of a non-transitory computer readable recording medium.

4. Functional Configuration of Information Processing Apparatus

Figure 4:
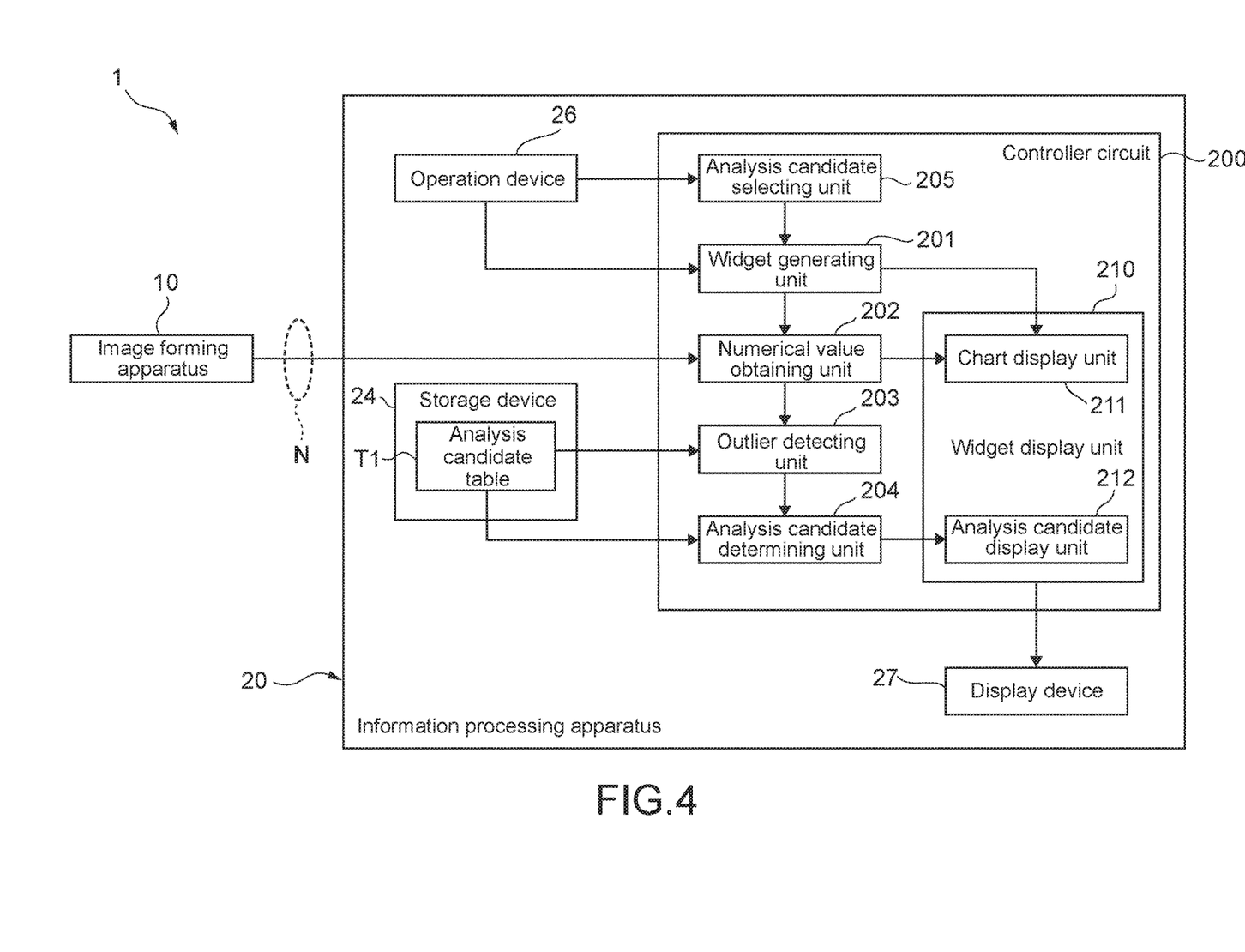
FIG. 4 shows a functional configuration of the information processing apparatus.

FIG. 4 shows a functional configuration of the information processing apparatus.

In the controller circuit 200 of the information processing apparatus 20, the CPU 21 loads an image processing program stored in the ROM 22 in the RAM 23 and executes the image processing program to thereby operate as the widget generating unit 201, the numerical value obtaining unit 202, the outlier detecting unit 203, the analysis candidate determining unit 204, the analysis candidate selecting unit 205, and the widget display unit 210. The widget display unit 210 includes the chart display unit 211 and the analysis candidate display unit 212. In the present specification, the term "chart" means a graph.

5. Example of a Structure of an Analysis Candidate Table

FIG. 5 shows an example of a structure of an analysis candidate table.

The storage device 24 of the information processing apparatus 20 stores the analysis candidate table T1. The analysis candidate table T1 is configured to register, in association with each other, the element 110, the outlier value condition 120, and the analysis candidate 130.

The element 110 is an element about the information processing apparatus 20 and has a variable numerical value. The element 110 is, for example, the printed sheet volume, the productive time length, the number of jobs, the sheet size, the ink use volume, or the like. In the present specification, the term "numerical value" means a number.

The outlier value condition 120 is, for example, a condition (for example, threshold or statistical analysis method) for determining that a variable numerical value of the element 110 is an outlier value. If the condition 120 is a threshold, different thresholds are registered for different elements 110. Note that the present disclosure uses the term "outlier value" for convenience. However, the "outlier value" also means a notable numerical value that is not irregular actually.

The analysis candidate 130 indicates candidates of analysis actions for an outlier value about the element 110 where the variable numerical value of the element 110 satisfies the outlier value condition 120 (i.e., where outlier value is detected).

For example, the analysis candidate table T1 is configured to, in association with each other, register, as the element 110, the wasted sheet volume 111, register, as the outlier value condition 120, that a numerical value of the wasted sheet volume is larger than a first threshold 121, and register, the following analysis candidate 131.

(1) An action of generating and displaying a chart widget (for example, bar chart widget) showing numerical values of the wasted sheet volume in subdivided time periods (for example, month, week, or day) in the certain time period, (2) an action of generating and displaying a chart widget (for example, pie chart widget) showing a breakdown (for example, ratio of cancel, jam, and job execution error) of causes of the wasted sheet volume in the certain time period, (3) an action of generating and displaying a chart widget (for example, pie chart widget) showing a breakdown of numerical values sorted by a medium type of the wasted sheet volume in the certain time period, and (4) an action of generating and displaying a list of jobs executed by the image forming apparatus and a list widget of the information processing apparatus.

For example, the analysis candidate table T1 is configured to, in association with each other, register, as the element 110, the wasted ink volume 112, register, as the outlier value condition 120, that a numerical value of the wasted ink volume is larger than a second threshold 122, and register, the following analysis candidate 132.

(1) An action of generating and displaying a chart widget (for example, bar chart widget) showing a numerical value of the wasted ink volume in subdivided time periods (for example, month, week, or day) in the certain time period, (2) an action of generating and displaying a chart widget (for example, pie chart widget) showing a breakdown (for example, ratio of cancel, jam, and job execution error) of causes of the wasted ink volume within the certain time period, and (3) an action of generating and displaying a list of jobs executed by the image forming apparatus and a list widget of the information processing apparatus.

For example, the analysis candidate table T1 is configured to, in association with each other, register, as the element 110, the pause time length 113, register, as the outlier value condition 120, that a numerical value of the pause time length is larger than a third threshold 123, register the following analysis candidate 133.

(1) An action of generating and displaying a chart widget (for example, bar chart widget) showing a numerical value of the pause time length in subdivided time periods (for example, month, week, or day) in the certain time period, (2) an action of generating and displaying a chart widget (for example, pie chart widget) showing a breakdown (for example, ratio of cancel, jam, and job execution error) of causes of the pause time length in the certain time period, and (3) an action of generating and displaying a list of jobs executed by the image forming apparatus and a list widget of the information processing apparatus.

6. Operational Flow of Information Processing Apparatus

Figure 6:
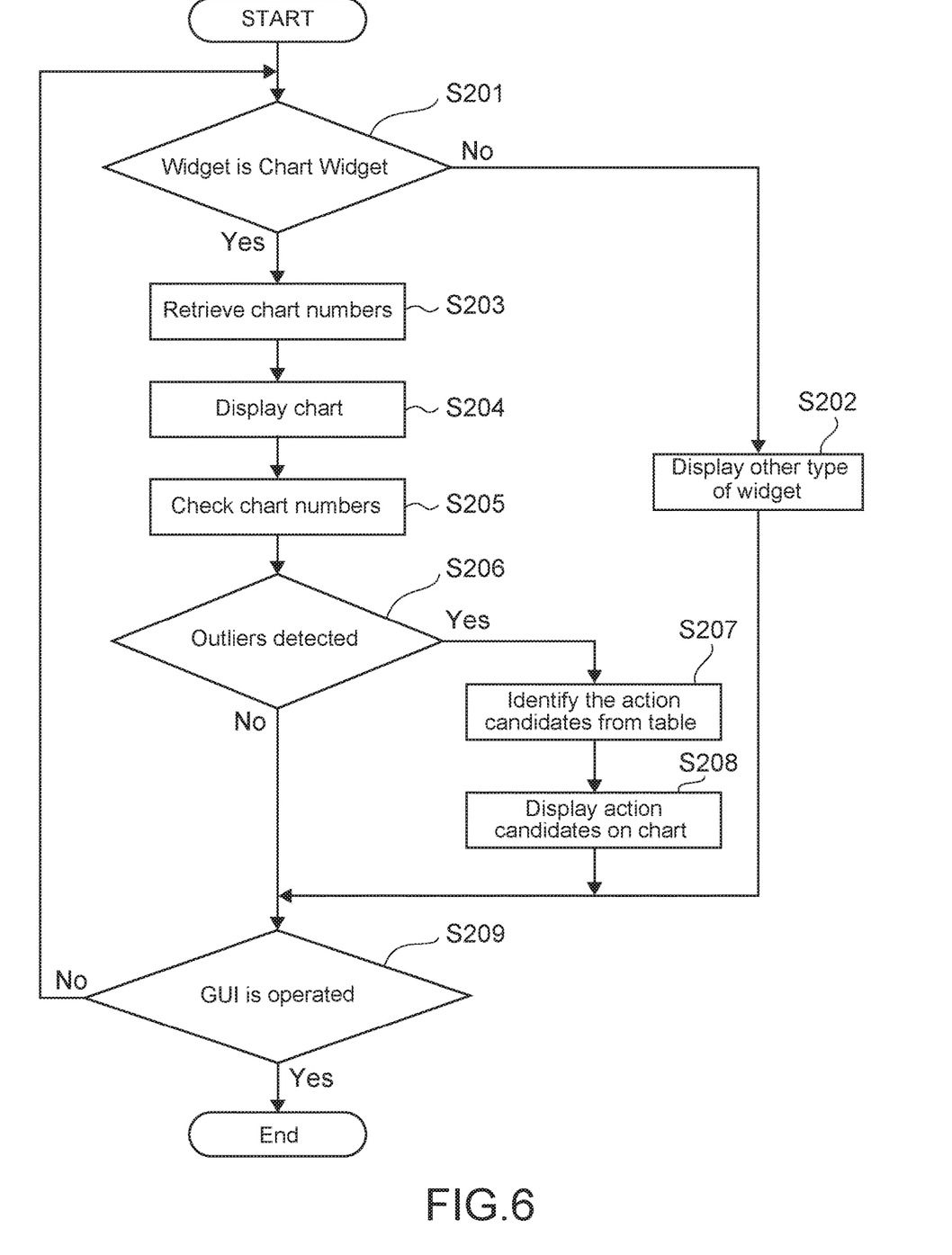
FIG. 6 shows an operational flow of the information processing apparatus.

FIG. 6 shows an operational flow of the information processing apparatus.

The dashboard application program is already running on the information processing apparatus 20 when the information processing apparatus 20 starts the operational flow.

The widget generating unit 201 determines a widget to be generated (Step S201). The "widget" is, for example, a chart widget for displaying the time-varying trend of the numerical value of the image forming apparatus 10 in a certain time period on the basis of information collected from the image forming apparatus 10. Specifically, the widget generating unit 201 determines a certain time period, a certain element, and a widget type specified by a user via the operation device 26. The widget generating unit 201 determines, on the basis of the information, which type of widget to generate about the certain element of the image forming apparatus 10 in the certain time period. The "certain time period" may be a time period of, for example, each year, each month, each week, each day, or the like. The "widget type" may include a chart (bar chart, pie chart, etc.) and a widget other than a chart (only texts and numerical values, schematic diagram showing ink level, schematic diagram showing body of image forming apparatus 10, etc.).

When the widget generating unit 201 is to generate a widget other than a chart (Step S201, No), the widget generating unit 201 generates the widget, and instructs the widget display unit 210 to display the widget. The widget display unit 210 displays the widget on the display device 27 in response to the instruction (Step S202).

Meanwhile, when the widget generating unit 201 is to generate a chart widget (Step S201, Yes), the widget generating unit 201 generates a widget (chart widget) about the certain element of the image forming apparatus 10 in the certain time period. At this time, the widget generating unit 201 generates a widget including a chart background frame, a chart name (which means certain element), and the like, but failing to include a chart itself, which varies depending on a variable numerical value.

The numerical value obtaining unit 202 sends, to the image forming apparatus 10, a request to obtain numerical values about the certain element in the certain time period. The numerical value obtaining unit 202 receives (retrieves) numerical values about the certain element in the certain time period from the image forming apparatus 10 (Step S203).

The chart display unit 211 of the widget display unit 210 generates a chart on the basis of the widget generated by the widget generating unit 201 and the numerical values received by the numerical value obtaining unit 202. The chart display unit 211 displays the generated chart on the display device 27 (Step S204).

Figure 7:
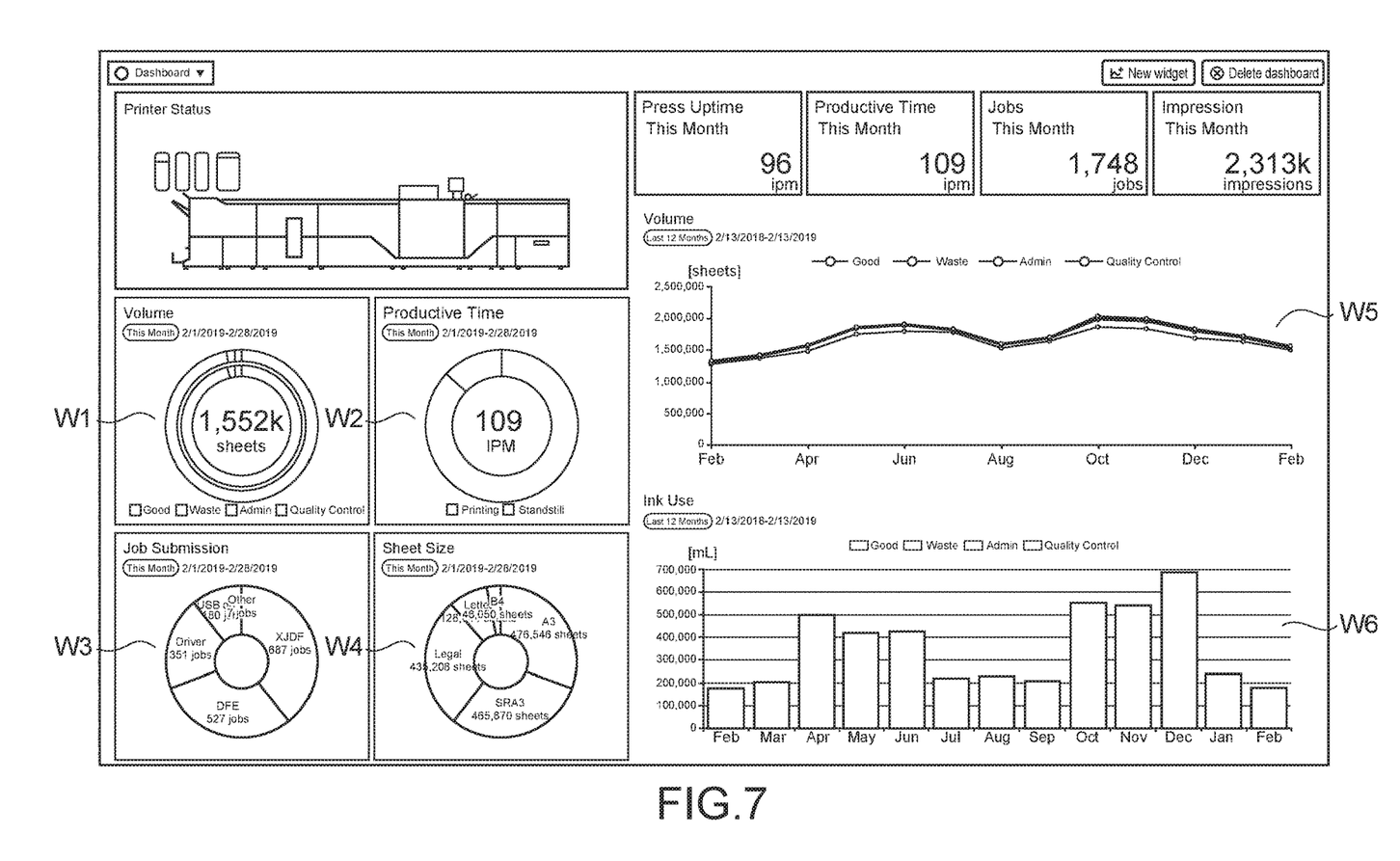
FIG. 7 shows an example of a plurality of widgets displayed on a display device.

FIG. 7 shows an example of a plurality of widgets displayed on a display device.

For example, the following widgets W1 to W6 are displayed on the display device 27. The widget W1 is a pie chart showing a breakdown of the printed sheet volume and wasted sheet volume of one month. The widget W2 is a pie chart showing the productive time length and breakdown of one month. The widget W3 is a pie chart showing the number of jobs and breakdown of one month. The widget W4 is a pie chart showing the printed sheet volume and breakdown of each sheet size of one month. The widget W5 is a line chart showing the printed sheet volume and breakdown of each month of 12 months (one year). The widget W6 is a bar chart showing the wasted ink volume and breakdown of each month of 12 months (one year).

With reference to FIG. 6, the outlier detecting unit 203 detects whether or not the numerical value (numerical values received by the numerical value obtaining unit 202) about the certain element includes an outlier value (Step S205). Specifically, the outlier detecting unit 203 detects an outlier value (Step S206, Yes) if the numerical value about the certain element obtained from the image forming apparatus 10 satisfies the outlier value condition 120 registered in the analysis candidate table T1 in association with the element 110.

If the analysis candidate determining unit 204 detects an outlier value about the certain element (Step S206, Yes), the analysis candidate determining unit 204 determines analysis candidate indicating candidates of an analysis action for the outlier value about the certain element (Step S206). Specifically, the analysis candidate determining unit 204 reads the analysis candidate 130 registered in the analysis candidate table T1 in association with the element 110.

In FIG. 5, for example, with reference to the analysis candidate table T1, if the outlier detecting unit 203 determines that the wasted sheet volume 111 as the element 110 satisfies the outlier value condition 120 (a numerical value of the wasted sheet volume is larger than a first threshold 121) registered in association with the wasted sheet volume 111, the outlier detecting unit 203 detects the outlier value (Step S206, Yes).

Then, with reference to the analysis candidate table T1, the analysis candidate determining unit 204 reads the items (1) to (4) of the analysis candidate 131 registered in association with the wasted sheet volume 111 as the element 110 (Step S207).

Figure 8:
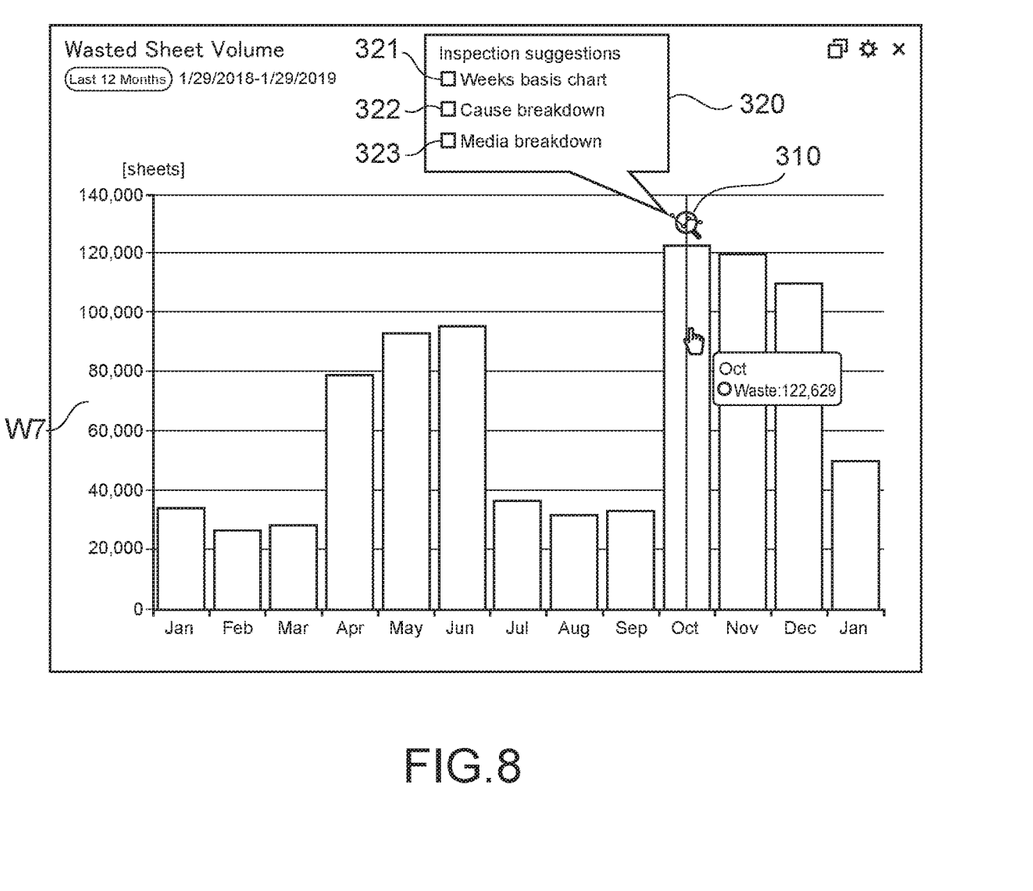
FIG. 8 shows another example of a plurality of widgets displayed on the display device.

FIG. 8 shows another example of a plurality of widgets displayed on the display device.

For example, the widget W7 displayed on the display device 27 is a bar chart showing the printed sheet volume and breakdown of each month of 12 months (one year). The widget W7 is merely one example, and is different from all the widgets W1 to W6 (FIG. 7).

The analysis candidate display unit 212 of the widget display unit 210 generates the first GUI 310 indicating an outlier value. The analysis candidate display unit 212 displays the first GUI 310 in association with the bar, which indicates the outlier value, of the bar chart of the widget W7 displayed on the display device 27. In this example, the first GUI 310 is a combination of an icon and a straight line extending in the longitudinal direction of the bar.

The analysis candidate display unit 212 of the widget display unit 210 further generates the second GUI 320 configured to instruct to execute all or part of the analysis actions (1) to (4) indicated by the analysis candidate 131 read by the analysis candidate determining unit 204. In this example, the second GUI 320 includes the GUIs 321, 322, and 323 for selecting three types of actions. The GUI 321 is a GUI for selecting (1) an action of generating and displaying a chart widget showing numerical values of the wasted sheet volume in subdivided time periods (week) in the certain time period. The GUI 322 is a GUI for selecting (2) an action of generating and displaying a chart widget showing a breakdown of causes of the wasted sheet volume in the certain time period. The GUI 323 is a GUI for selecting (3) an action of generating and displaying a chart widget showing a breakdown of numerical values sorted by a medium type of the wasted sheet volume in the certain time period.

The analysis candidate selecting unit 205 detects that the first GUI 310 of the widget W7 displayed on the display device 27 is operated or pointed by a cursor.

Then the analysis candidate display unit 212 of the widget display unit 210 displays the second GUI 320 on the display device 27 (Step S208). Typically, the analysis candidate display unit 212 displays the second GUI 320 in association with the bar, which indicates the outlier value, of the bar chart of the widget W7 displayed on the display device 27, and/or in association with the first GUI 310. In this example, the analysis candidate display unit 212 displays the second GUI 320 having a speech balloon shape and popping up from the first GUI 310 (i.e., in association with the first GUI 310).

The analysis candidate selecting unit 205 detects that one of the GUIs 321, 322, and 323 of the second GUI 320 of the widget W7 displayed on the display device 27 is operated (Step S209, Yes).

Then the widget generating unit 201 generates a widget in accordance with the analysis action instructed via the selected the GUI 321, 322, or 323 of the second GUI 320 (Step S201, Yes). For example, if the GUI 321 is selected, the widget generating unit 201 generates not a month-increment chart widget (FIG. 8) but a week-increment chart widget. The widget display unit 210 generates a widget, and displays the widget on the display device 27 (Step S202).

The numerical value obtaining unit 202 obtains numerical values in accordance with the analysis action instructed via the selected GUI 321 in the second GUI 320 (Step S203). The chart display unit 211 generates an analysis chart on the basis of the widget and the numerical values, and displays the analysis chart (week-increment chart) on the display device 27 (Step S204).

After that, the operation on and after Step S205 is further executed for the newly-displayed analysis chart (week-increment chart). As a result, a first GUI is displayed in association with an outlier value of the analysis chart (week-increment chart). If the first GUI is operated or pointed by a cursor, a second GUI is displayed.

As a result of repeating that operation (Step S209), for example, a user may narrow down the time period (for example, day), which has a largest number of outlier values, out of a subdivided time period (for example, week) in a certain time period.

7. Modification Example

In the present embodiment, the numerical value obtaining unit 202 of the information processing apparatus 20 receives numerical values about a certain element in a certain time period from the image forming apparatus 10 (Step S203).

Instead, the image forming apparatus management system 1 may further include a server apparatus (not shown). The image forming apparatus 10 sends numerical values about a certain element in a certain time period to the server apparatus, for example, at regular intervals. The server apparatus receives numerical values about a certain element in a certain time period from the image forming apparatus 10, and stores (accumulates) the numerical values. The numerical value obtaining unit 202 of the information processing apparatus 20 requests for a numerical value about a certain element of a certain image forming apparatus 10 in a certain time period to the server apparatus. The server apparatus sends a numerical value about a certain element of the certain image forming apparatus 10 in a certain time period to the information processing apparatus 20. The information processing apparatus 20 receives the numerical value about the certain element of the certain image forming apparatus 10 in the certain time period from the server apparatus.

8. Conclusion

There is known a dashboard application for displaying a chart widget showing a time-varying trend of numerical values of a certain element in a certain time period on the basis of information collected from an image forming apparatus. With the dashboard application, a user (for example, an operator, a manager, or the like of a print shop in which the image forming apparatus is provided) may visually confirm the current status, the use history in a certain time period, and the trend of the image forming apparatus.

For example, a dashboard application displays a chart showing the number of jobs processed in each month, and displays a chart showing a printed sheet volume or a use volume of a resource such as ink or toners. Further, some applications enable the following function. A user specifies one of available information elements and further specifies a time period and an analysis unit (each month, each week, or each day), and a desired chart widget is displayed.

Further, detailed information such as the wasted sheet volume (printing failure for some reason such as paper jam), the wasted ink volume, the device downtime in the productive time, and the like may be displayed on charts depending on the dashboard application setting configuration set by a user.

However, with reference to the aforementioned charts, a user (for example, an operator, a manager, or the like of a print shop in which the image forming apparatus is provided) has to find some outliers or unfavorable trends and then try to analyze causes and solve the problem on a basis of experiences of the user. It is not user-friendly, and some users may not find the trends accurately.

In view of the aforementioned circumstances, according to the present disclosure, the outlier detecting unit 203 detects whether or not numerical values (numerical values received by the numerical value obtaining unit 202) about a certain element includes an outlier value (Steps S205 and S206). The analysis candidate determining unit 204 determines an analysis candidate indicating a candidate of an analysis action for the outlier value (Step S207). The analysis candidate display unit 212 displays the first GUI 310 indicating the outlier value. As a result, a user may notice the outlier value without determining (i.e., finding) the outlier value by himself.

Further, if the first GUI 310 is operated or instructed, the analysis candidate display unit 212 displays the second GUI 320 configured to instruct to execute an analysis action on the display device 27 (Step S208). If the second GUI 320 is selected, the chart display unit 211 displays a chart (analysis chart) generated depending on the analysis action instructed via the second GUI 320 (Step S204). As a result, all the user needs to do is to select the second GUI 320 to execute the analysis action and display the analysis chart. So the user may narrow down the further detailed analysis result and the trends efficiently.

Further, the first GUI 310 and the second GUI 320 are also displayed on a newly-displayed analysis chart. As a result of repeating that operation (Step S209), for example, a user may narrow down the time period (for example, day), which has a largest number of outlier values, out of a subdivided time period (for example, week) in a certain time period efficiently.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing apparatus, comprising:
a controller circuit configured to operate as
a widget generating unit configured to generate a widget about a certain element of an image forming apparatus in a certain time period,
a numerical value obtaining unit configured to obtain a numerical value about the certain element of the image forming apparatus in the certain time period,
a chart display unit configured to generate a chart on a basis of the widget and the numerical value, and display the chart on a display device,
an outlier detecting unit configured to detect an outlier value included in the numerical value about the certain element,
an analysis candidate determining unit configured to determine a plurality of analysis candidates if the outlier value about the certain element is detected, the plurality of analysis candidates indicating a plurality of candidates of a plurality of analysis actions for the outlier value about the certain element, the plurality of analysis candidates respectively including a plurality of different attributes about the certain element and a plurality of different types of widgets, and
an analysis candidate display unit configured to
generate a first GUI indicating the outlier value, and display the first GUI in association with the outlier value in the chart displayed on the display device, and
generate a second GUI configured to instruct to execute one analysis action out of the plurality of analysis actions that the plurality of analysis candidates indicate, and display the second GUI on the display device if the first GUI displayed on the display device is operated or pointed by a cursor,
wherein
the widget generating unit is configured to, if the second GUI is operated, generate a widget in accordance with the one analysis action instructed via the second GUI,
the numerical value obtaining unit is configured to obtain a numerical value in accordance with the one analysis action instructed via the second GUI, and
the chart display unit is configured to generate an analysis chart on a basis of the widget and the numerical value in accordance with the one analysis action instructed via the second GUI, and display the analysis chart on the display device,
wherein
the outlier detecting unit is configured to detect one other outlier value included in the numerical value obtained in accordance with the one analysis action instructed via the second GUI,
the analysis candidate determining unit is configured to determine a plurality of other analysis candidates if the other outlier value is detected, the plurality of other analysis candidates indicating a plurality of other candidates of a plurality of other analysis actions for the other outlier value, and the analysis candidate display unit is configured to
generate a first GUI indicating the other outlier value, and display the first GUI in association with the other outlier value in the analysis chart displayed on the display device, and
generate a second GUI configured to instruct to execute one other analysis action out of the plurality of other analysis actions that the plurality of other analysis candidates indicate, and display the second GUI on the display device if the first GUI displayed in association with the other outlier value in the analysis chart on the display device is operated or pointed by a cursor, and wherein by repeating, upon the operation of the second GUI configured to instruct to execute one analysis action out of the plurality of analysis actions that the plurality of analysis candidates indicate, the step of generating a widget, the step of obtaining a numerical value, and the step of generating an analysis chart, a narrowed-down subdivided time period, which has a largest number of outlier values in the certain time period, is displayed on the display device.

2. The information processing apparatus according to claim 1, further comprising:

a storage device configured to store an analysis candidate table, the analysis candidate table being configured to register the certain element, a condition of the outlier value, and the plurality of analysis candidates in association with each other, wherein the outlier detecting unit is configured to detect the outlier value if the numerical value about the certain element of the image forming apparatus satisfies the condition of the outlier value registered in the analysis candidate table in association with the certain element, and the analysis candidate determining unit is configured to read the analysis candidate registered in the plurality of analysis candidates table in association with the certain element.

3. The information processing apparatus according to claim 2, wherein the analysis candidate table is configured to, in association with each other, register, as the certain element, a wasted sheet volume, register, as the condition of the outlier value, that a numerical value of the wasted sheet volume is larger than a first threshold, and register, as the plurality of analysis candidates,
(1) an action of generating and displaying a chart widget showing numerical values of the wasted sheet volume in subdivided time periods in the certain time period,
(2) an action of generating and displaying a chart widget showing a breakdown of causes of the wasted sheet volume in the certain time period,
(3) an action of generating and displaying a chart widget showing a breakdown of numerical values sorted by a medium type of the wasted sheet volume in the certain time period, and
(4) an action of generating and displaying a list of jobs executed by the image forming apparatus and a list widget of the information processing apparatus.

4. The information processing apparatus according to claim 2, wherein the analysis candidate table is configured to, in association with each other, register, as the certain element, a wasted ink volume, register, as the condition of the outlier value, that a numerical value of the wasted ink volume is larger than a second threshold, and register, as the plurality of analysis candidates,
(1) an action of generating and displaying a chart widget showing a numerical value of the wasted ink volume in subdivided time periods in the certain time period,
(2) an action of generating and displaying a chart widget showing a breakdown of causes of the wasted ink volume within the certain time period, and
(3) an action of generating and displaying a list of jobs executed by the image forming apparatus and a list widget of the information processing apparatus.

5. The information processing apparatus according to claim 2, wherein the analysis candidate table is configured to, in association with each other, register, as the certain element, a pause time length, register, as the condition of the outlier value, that a numerical value of the pause time length is larger than a third threshold, register, as the plurality of analysis candidates,
(1) an action of generating and displaying a chart widget showing a numerical value of the pause time length in subdivided time periods in the certain time period,
(2) an action of generating and displaying a chart widget showing a breakdown of causes of the pause time length in the certain time period, and
(3) an action of generating and displaying a list of jobs executed by the image forming apparatus and a list widget of the information processing apparatus.

6. The information processing apparatus according to claim 1, wherein the numerical value obtaining unit is configured to receive the numerical value from the image forming apparatus.

7. The information processing apparatus according to claim 1, wherein the numerical value obtaining unit is configured to receive the numerical value from a server apparatus configured to receive and store the numerical value sent from the image forming apparatus.

8. A non-transitory computer readable recording medium that records a dashboard application program, the dashboard application program causing a controller circuit of an information processing apparatus to operate as:

a widget generating unit configured to generate a widget about a certain element of an image forming apparatus in a certain time period;

a numerical value obtaining unit configured to obtain a numerical value about the certain element of the image forming apparatus in the certain time period;

a chart display unit configured to generate a chart on a basis of the widget and the numerical value, and display the chart on a display device;

an outlier detecting unit configured to detect an outlier value included in the numerical value about the certain element;

an analysis candidate determining unit configured to determine a plurality of analysis candidates if the outlier value about the certain element is detected, the plurality of analysis candidates indicating a plurality of candidates of a plurality of analysis actions for the outlier value about the certain element, the plurality of analysis candidates respectively including a plurality of different attributes about the certain element and a plurality of different types of widgets; and an analysis candidate display unit configured to
generate a first GUI indicating the outlier value, and display the first GUI in association with the outlier value in the chart displayed on the display device, and generate a second GUI configured to instruct to execute one analysis action out of the plurality of analysis actions that the plurality of analysis candidates indicate, and display the second GUI on the display device if the first GUI displayed on the display device is operated or pointed by a cursor, wherein the widget generating unit is configured to, if the second GUI is operated, generate a widget in accordance with the one analysis action instructed via the second GUI, the numerical value obtaining unit is configured to obtain a numerical value in accordance with the one analysis action instructed via the second GUI, and the chart display unit is configured to generate an analysis chart on a basis of the widget and the numerical value in accordance with the one analysis action instructed via the second GUI, and display the analysis chart on the display device, wherein the outlier detecting unit is configured to detect one other outlier value included in the numerical value obtained in accordance with the one analysis action instructed via the second GUI, the analysis candidate determining unit is configured to determine a plurality of other analysis candidates if the other outlier value is detected, the plurality of other analysis candidates indicating a plurality of other candidates of a plurality of other analysis actions for the other outlier value, and the analysis candidate display unit is configured to
generate a first GUI indicating the other outlier value, and display the first GUI in association with the other outlier value in the analysis chart displayed on the display device, and generate a second GUI configured to instruct to execute one other analysis action out of the plurality of other analysis actions that the plurality of other analysis candidates indicate, and display the second GUI on the display device if the first GUI displayed in association with the other outlier value in the analysis chart on the display device is operated or pointed by a cursor, and wherein by repeating, upon the operation of the second GUI configured to instruct to execute one analysis action out of the plurality of analysis actions that the plurality of analysis candidates indicate, the step of generating a widget, the step of obtaining a numerical value, and the step of generating an analysis chart, a narrowed-down subdivided time period, which has a largest number of outlier values in the certain time period, is displayed on the display device.

9. The non-transitory computer readable recording medium according to claim 8, wherein
the information processing apparatus includes a storage device configured to store an analysis candidate table, the analysis candidate table being configured to register the certain element, a condition of the outlier value, and the plurality of analysis candidates in association with each other, the outlier detecting unit is configured to detect the outlier value if the numerical value about the certain element of the image forming apparatus satisfies the condition of the outlier value registered in the analysis candidate table in association with the certain element, and the analysis candidate determining unit is configured to read the analysis candidate registered in the plurality of analysis candidates table in association with the certain element.

10. The non-transitory computer readable recording medium according to claim 9, wherein
the analysis candidate table is configured to, in association with each other, register, as the certain element, a wasted sheet volume, register, as the condition of the outlier value, that a numerical value of the wasted sheet volume is larger than a first threshold, and register, as the plurality of analysis candidates,
(1) an action of generating and displaying a chart widget showing numerical values of the wasted sheet volume in subdivided time periods in the certain time period,
(2) an action of generating and displaying a chart widget showing a breakdown of causes of the wasted sheet volume in the certain time period,
(3) an action of generating and displaying a chart widget showing a breakdown of numerical values sorted by a medium type of the wasted sheet volume in the certain time period, and
(4) an action of generating and displaying a list of jobs executed by the image forming apparatus and a list widget of the information processing apparatus.

11. The non-transitory computer readable recording medium according to claim 9, wherein
the analysis candidate table is configured to, in association with each other, register, as the certain element, a wasted ink volume, register, as the condition of the outlier value, that a numerical value of the wasted ink volume is larger than a second threshold, and register, as the plurality of analysis candidates,
(1) an action of generating and displaying a chart widget showing a numerical value of the wasted ink volume in subdivided time periods in the certain time period,
(2) an action of generating and displaying a chart widget showing a breakdown of causes of the wasted ink volume within the certain time period, and
(3) an action of generating and displaying a list of jobs executed by the image forming apparatus and a list widget of the information processing apparatus.

12. The non-transitory computer readable recording medium according to claim 9, wherein
the analysis candidate table is configured to, in association with each other, register, as the certain element, a pause time length, register, as the condition of the outlier value, that a numerical value of the pause time length is larger than a third threshold, register, as the plurality of analysis candidates,
(1) an action of generating and displaying a chart widget showing a numerical value of the pause time length in subdivided time periods in the certain time period,
(2) an action of generating and displaying a chart widget showing a breakdown of causes of the pause time length in the certain time period, and (3) an action of generating and displaying a list of jobs executed by the image forming apparatus and a list widget of the information processing apparatus.

13. An image forming apparatus management system, comprising:
- an image forming apparatus; and
- an information processing apparatus including
- a controller circuit configured to operate as
- a widget generating unit configured to generate a widget about a certain element of an image forming apparatus in a certain time period,
- a numerical value obtaining unit configured to obtain a numerical value about the certain element of the image forming apparatus in the certain time period,
- a chart display unit configured to generate a chart on a basis of the widget and the numerical value, and display the chart on a display device,
- an outlier detecting unit configured to detect an outlier value included in the numerical value about the certain element,
- an analysis candidate determining unit configured to determine a plurality of analysis candidates if the outlier value about the certain element is detected, the plurality of analysis candidates indicating a plurality of candidates of a plurality of analysis actions for the outlier value about the certain element, the plurality of analysis candidates respectively including a plurality of different attributes about the certain element and a plurality of different types of widgets, and
- an analysis candidate display unit configured to
  - generate a first GUI indicating the outlier value, and display the first GUI in association with the outlier value in the chart displayed on the display device, and
  - generate a second GUI configured to instruct to execute one analysis action out of the plurality of analysis actions that the plurality of analysis candidates indicate, and display the second GUI on the display device if the first GUI displayed on the display device is operated or pointed by a cursor, wherein
the widget generating unit is configured to, if the second GUI is operated, generate a widget in accordance with the one analysis action instructed via the second GUI,
the numerical value obtaining unit is configured to obtain a numerical value in accordance with the one analysis action instructed via the second GUI, and
the chart display unit is configured to generate an analysis chart on a basis of the widget and the numerical value in accordance with the one analysis action instructed via the second GUI, and display the analysis chart on the display device, wherein
the outlier detecting unit is configured to detect one other outlier value included in the numerical value obtained in accordance with the one analysis action instructed via the second GUI,
the analysis candidate determining unit is configured to determine a plurality of other analysis candidates if the other outlier value is detected, the plurality of other analysis candidates indicating a plurality of other candidates of a plurality of other analysis actions for the other outlier value, and
the analysis candidate display unit is configured to
  - generate a first GUI indicating the other outlier value, and display the first GUI in association with the other outlier value in the analysis chart displayed on the display device, and
  - generate a second GUI configured to instruct to execute one other analysis action out of the plurality of other analysis actions that the plurality of other analysis candidates indicate, and display the second GUI on the display device if the first GUI displayed in association with the other outlier value in the analysis chart on the display device is operated or pointed by a cursor, and wherein
by repeating, upon the operation of the second GUI configured to instruct to execute one analysis action out of the plurality of analysis actions that the plurality of analysis candidates indicate, the step of generating a widget, the step of obtaining a numerical value, and the step of generating an analysis chart, a narrowed-down subdivided time period, which has a largest number of outlier values in the certain time period, is displayed on the display device.

14. The image forming apparatus management system according to claim 13, wherein
the numerical value obtaining unit is configured to receive the numerical value from the image forming apparatus.

15. The image forming apparatus management system according to claim 13, further comprising:
- a server apparatus configured to receive and store the numerical value sent from the image forming apparatus, wherein
- the numerical value obtaining unit is configured to receive the numerical value from the server apparatus.

* * * * *